United States Patent
Ben Rached et al.

(10) Patent No.: US 8,982,683 B2
(45) Date of Patent: Mar. 17, 2015

(54) TRANSMISSION METHOD AND RELATED DEVICE

(75) Inventors: Nidham Ben Rached, Paris (FR); Thierry Lucidarme, Montigny-le-Bretonneux (FR)

(73) Assignee: Apple Inc., Cupertino, CA (US)

( * ) Notice: Subject to any disclaimer, the term of this patent is extended or adjusted under 35 U.S.C. 154(b) by 2536 days.

(21) Appl. No.: 11/593,721

(22) Filed: Nov. 7, 2006

(65) Prior Publication Data

US 2008/0107012 A1  May 8, 2008

(51) Int. Cl.
*H04J 11/00* (2006.01)
*H04L 5/00* (2006.01)
*H04L 27/26* (2006.01)

(52) U.S. Cl.
CPC .......... *H04L 5/0007* (2013.01); *H04L 27/2623* (2013.01)
USPC .......................................... 370/203; 375/260

(58) Field of Classification Search
None
See application file for complete search history.

(56) References Cited

U.S. PATENT DOCUMENTS

| | | | | |
|---|---|---|---|---|
| 6,826,240 | B1 * | 11/2004 | Thomas et al. | 375/340 |
| 7,418,043 | B2 * | 8/2008 | Shattil | 375/260 |
| 7,467,338 | B2 * | 12/2008 | Saul | 714/712 |
| 7,519,123 | B1 * | 4/2009 | Larsson et al. | 375/260 |
| 2006/0133524 | A1 * | 6/2006 | Hamada et al. | 375/260 |
| 2006/0188003 | A1 * | 8/2006 | Larsson | 375/130 |
| 2007/0258352 | A1 * | 11/2007 | Wang et al. | 370/203 |
| 2008/0233901 | A1 * | 9/2008 | Ebiko et al. | 455/114.2 |

* cited by examiner

*Primary Examiner* — Mohammad Adhami
(74) *Attorney, Agent, or Firm* — Meyertons, Hood, Kivlin, Kowert & Goetzel, P.C.

(57) ABSTRACT

A method for transmitting a signal carrying information elements over a plurality of frequency subcarriers simultaneously. The method comprises: identifying a set of at least one frequency subcarrier of the plurality particularly subjected to attenuation; and transmitting the signal simultaneously over said plurality of frequency subcarriers by assigning respective information elements to the frequency subcarriers of the plurality not belonging to said set and assigning to each frequency subcarrier of said set a respective coefficient set so that an envelope of the transmitted signal is less than an envelope of the signal that would be transmitted by assigning respective information elements to all the frequency subcarriers of the plurality.

12 Claims, 4 Drawing Sheets

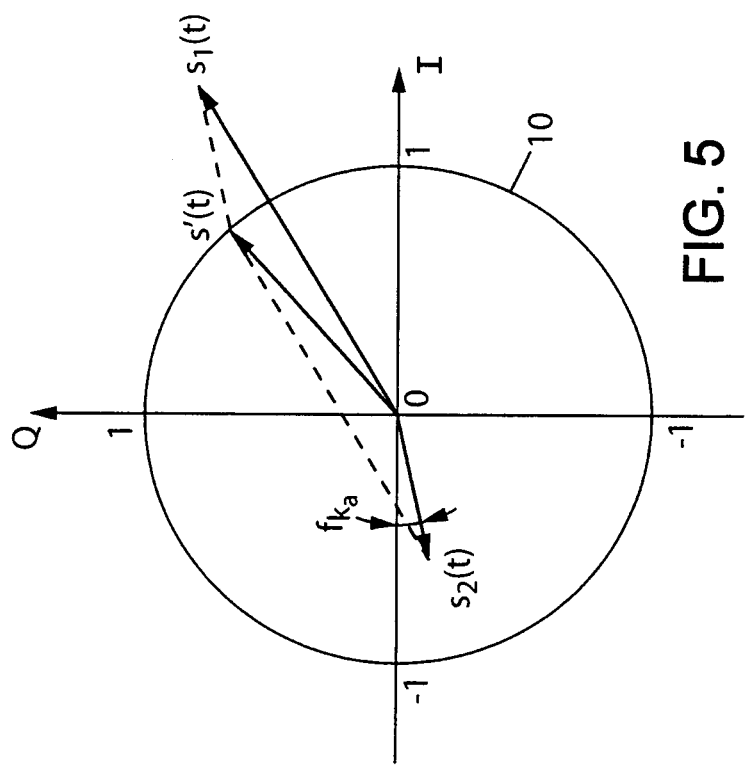

TRANSMISSION METHOD AND RELATED DEVICE

BACKGROUND OF THE INVENTION

The present invention relates to signal transmission.

It relates more particularly to transmission of a signal over a plurality of frequency subcarriers simultaneously.

This is the case, for instance, when using OFDM ("Orthogonal Frequency Division Multiplexing"). OFDM in its application to 3G radiocommunication systems is detailed in the technical report 3GPP TR 25.814 V7.0.0, Release 7, "Technical Specification Group Radio Access Network; Physical layer aspects for evolved Universal Terrestrial Radio Access (UTRA)", published in June 2006 by the 3rd Generation Partnership Project (3GPP).

FIG. 1 shows an example of a signal transmission using OFDM. A signal carrying information elements must be transmitted from a transmitter 1 to a receiver 2.

$X_n$ designates information to be transmitted. First, a module 3 of the transmitter 1 transforms this serial flow into a plurality of N parallel flows $X_{n,0}, X_{n,1} \ldots X_{n,N-1}$. As an example, each one of these flows may consist in a succession of bits having duration of $T_u$.

An Inverse Fast Fourier Transform 4 is then performed in the transmitter 1 from the N parallel flows $X_{n,0}, X_{n,1} \ldots X_{n,N-1}$. Once this operation is achieved, an OFDM symbol $s_m$ with duration of $T_u$ is obtained.

This symbol is coded over a plurality of frequency subcarriers separated by a guard band so as to reduce interference there between. Besides, the frequency subcarriers are orthogonal since the minimal duration of an information element carried by each one of them is the inverse of the guard band value.

The OFDM symbol $s_m$ is then transmitted over a communication channel 5 which may be of different nature, such as a radio channel. The receiver 2, listening to the channel 5, receives a symbol $\hat{s}_m$. Information elements $\hat{X}_{n,0}, \hat{X}_{n,1} \ldots \hat{X}_{n,N-1}$ are estimated from this symbol, each element corresponding to the information transmitted over one given frequency subcarrier of the plurality.

Finally, a conversion parallel to serial 7 allows obtaining an estimation $\hat{X}_n$ of the transmitted information $X_n$.

While OFDM is quite efficient against the Inter Symbol Interference phenomenon, a trouble is that it creates a signal envelope with a very large range resulting in strong variations in the instantaneous power. The Peak-to-Average Power Ratio (PAPR) may thus be quite high with OFDM.

As a consequence, devices having a transfer characteristic with saturation and using OFDM may suffer from such situation. This applies in particular to devices involved in transmission using OFDM, such as power amplifiers. Indeed, power amplifiers should avoid a saturation of the OFDM signal to be amplified and thus operate in a linear zone.

To avoid this, there is a need for reducing the PAPR in systems using OFDM. This need has been identified in the above mentioned technical report TR 25.814 (see paragraph 9.2.1.4). Circulated clipping and filtering are more particularly evoked as an efficient way of mitigating the PAPR.

The traditional way of using clipping is to suppress a group of adjacent frequency subcarriers—generally at an end of the frequency band—from the plurality of subcarriers over which the signal is to be transmitted. However, such clipping may induce an undesired loss of information.

An object of the present invention is to transmit a signal over a plurality of frequency subcarriers while reducing the PAPR and without loosing too much information.

SUMMARY OF THE INVENTION

The invention proposes a method for transmitting a signal carrying information elements over a plurality of frequency subcarriers simultaneously. The method comprised the following steps:
  identifying a set of at least one frequency subcarrier of the plurality particularly subjected to attenuation;
  transmitting the signal simultaneously over said plurality of frequency subcarriers by assigning respective information elements to the frequency subcarriers of the plurality not belonging to said set and assigning to each frequency subcarrier of said set a respective coefficient set so that an envelope of the transmitted signal is less than an envelope of the signal that would be transmitted by assigning respective information elements to all the frequency subcarriers of the plurality.

The setting of said coefficients allows reducing the PAPR of the transmitted signal. And the choice of particularly attenuated frequency subcarriers for reducing the PAPR, instead of carrying information elements, allows limiting the information loss.

Advantageously, the coefficients are set so that the amplitude of the transmitted signal is equal or less than a value above which a module involved in the signal transmission reaches saturation.

The invention further proposes a transmission device for transmitting a signal carrying information elements over a plurality of frequency subcarriers simultaneously. The transmission device comprises:
  identification means for identifying a set of at least one frequency subcarrier of the plurality particularly subjected to attenuation;
  transmission means for transmitting the signal simultaneously over said plurality of frequency subcarriers by assigning respective information elements to the frequency subcarriers of the plurality not belonging to said set and assigning to each frequency subcarrier of said set a respective coefficient set so that an envelope of the transmitted signal is less than an envelope of the signal that would be transmitted by assigning respective information elements to all the frequency subcarriers of the plurality.

The preferred features of the above aspects which are indicated by the dependent claims may be combined as appropriate, and may be combined with any of the above aspects of the invention, as would be apparent to a person skilled in the art.

BRIEF DESCRIPTION OF THE DRAWINGS

FIG. 5 is a complex representation of a transmitted OFDM signal built for having a reduced PAPR.

DESCRIPTION OF PREFERRED EMBODIMENTS

Figure 1:
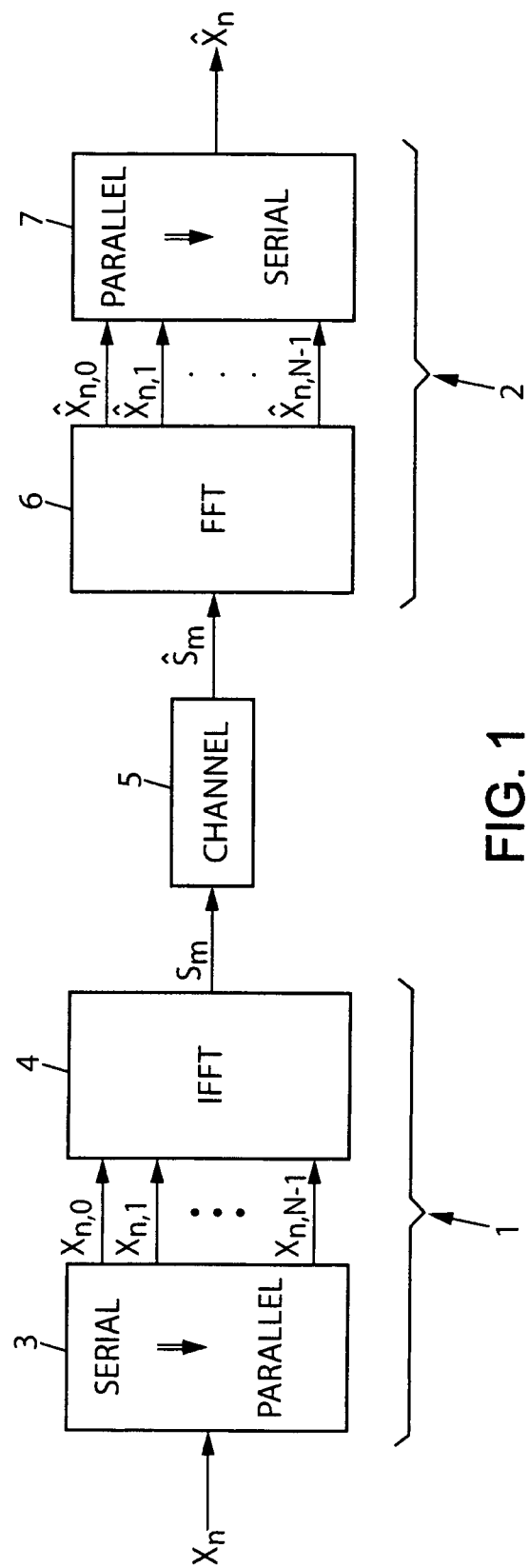
FIG. 1, already commented, is a schematic view of classical transmission and reception of an OFDM signal.
Figure 2:
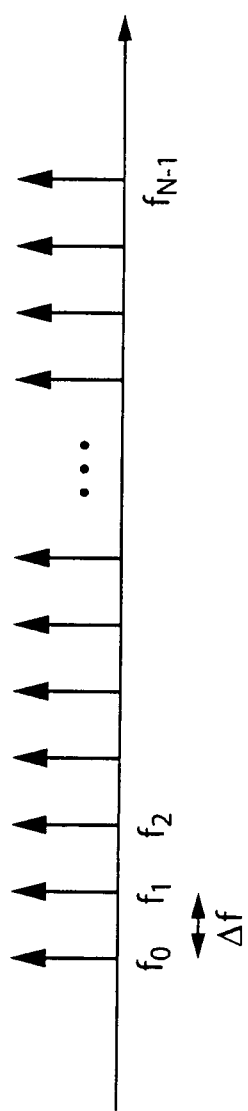
FIG. 2 is a schematic view of a plurality of N frequency subcarriers used for transmitting an OFDM signal.

As reminded in the introductory part, an OFDM signal s(t) is transmitted over a plurality of N frequency subcarriers distant from each other by a value Δf as illustrated in FIG. 2. As mentioned Δf is set so that the frequency subcarriers are orthogonal.

Such OFDM signal can be represented by:

$$s(t) = \frac{1}{\sqrt{N}} \sum_{k=0}^{N-1} a_k e^{j\frac{-2\pi k \Delta f}{N}}, \quad (1)$$

where $a_k$ designates one of the information elements to be transmitted.

Figure 3:
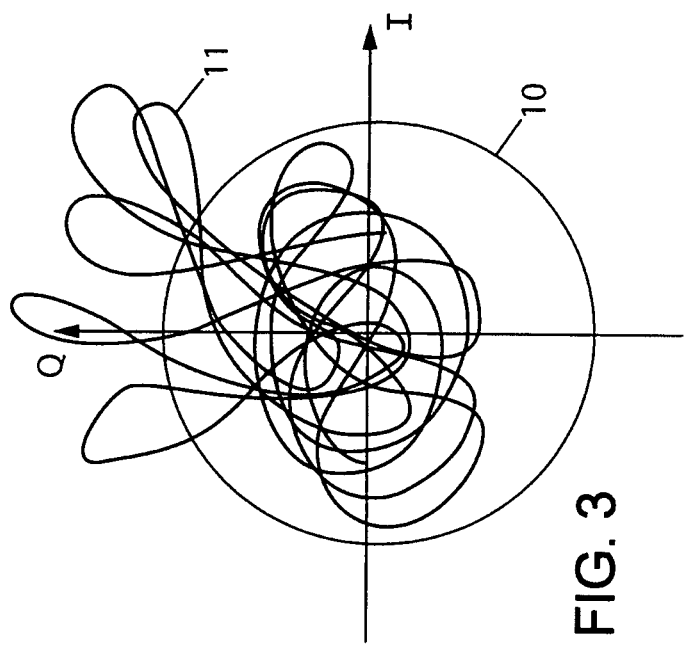
FIG. 3 is a complex representation at successive instants of a transmitted OFDM signal.

A complex representation signal s(t) is schematically illustrated in FIG. 3 at successive instants (reference 11) in a coordinate system including a real axis I and an imaginary axis Q.

The circle 10 also represented in FIG. 3 shows the maximum amplitude of the signal s(t) under which the device intending to transmit s(t) can operate correctly, i.e. in a linear zone. When s(t) goes out from this circle 10, saturation may occur in the power amplifier of the transmission device for instance.

The instantaneous envelope E of the signal s(t) is the real-valued function $|s(t)|^2$. The mode of operation described above with reference to FIG. 3 can be summarized in that, at any instant, E should be under a given value so that the transmission device works properly. Said given value depends on characteristics of the transmission device, e.g. the transfer characteristic of its power amplifier.

As to the PAPR, it is defined as a maximum value of the envelope E in an observation period.

According to the invention, a set of one or several of the N frequency subcarriers are identified due to the fact they are particularly subjected to attenuation. Indeed, the fading phenomenon is frequency selective and can affect only one or some of the frequency subcarriers. This identification step is preferably carried out at successive time intervals, in order to have an update set of particularly attenuated frequency subcarriers.

The time intervals may be chosen as a function of propagation conditions, a speed of a mobile reception device to which the OFDM signal is intended, or any other parameter affecting fading. To this effect, indicators such as propagation profile estimates on the one hand and doppler or speed estimates on the other hand could be used so that the propagation conditions or the speed of the reception device can be taken into account by the transmission device to determine the updating periodicity of the identification step.

The identification of the set of particularly attenuated frequency subcarriers could be obtained by the transmission device by analyzing a previously received signal. As an example, the reception device to which the signal s(t) is to be transmitted may have sent signals to the transmission device previously. Such signals may include an indication of the frequency subcarriers received at the reception device, together with an associated attenuation estimation or reception level. They could then be a basis for the transmission device to identify particularly attenuated frequency subcarriers.

As a variant, only the indication of particularly attenuated frequency subcarriers could be transmitted to the transmission device by the reception device. In this case, said particularly attenuated frequency subcarriers could be identified by the reception device by comparing their attenuation or reception level with the one of the other frequency subcarriers or with a determined threshold for instance.

If the signals received by the transmission device do not include indications from which the particularly attenuated frequency subcarriers could be directly derived, the transmission device may deduce them from attenuation estimations on the frequency subcarriers over which said signals have been received from the reception device. This can be done by comparing the attenuation estimation on each frequency subcarrier with the ones on the other frequency subcarriers or with a determined threshold for instance. Advantageously, the signals received by the transmission device are pilot signals. In this case, the identification of particularly attenuated frequency subcarriers may derive from an analysis of an impulse response of the channel carrying the pilot signals.

As a non-limiting example, the transmission and reception devices belong to a cellular radiocommunication system. For instance, the transmission device may be a base station and the reception device may be a mobile station.

When using OFDM, each one of the base station and the mobile station uses frequency subcarriers for transmission. If Time Division Duplexing (TDD) is implemented as described in the above mentioned technical report TR 25.814, the same frequency subcarriers are used for transmission in both downlink and uplink directions, since each TDD frame includes a downlink subframe and an uplink subframe. Due to this correlation, a fading occurring in the uplink direction would occur similarly in the downlink direction. Therefore, an estimation of the uplink fading on each frequency subcarrier by the base station, e.g. by means of an analysis of an uplink pilot channel impulse response, could be used as an estimation of the downlink fading on the corresponding frequency subcarrier.

Figure 4:
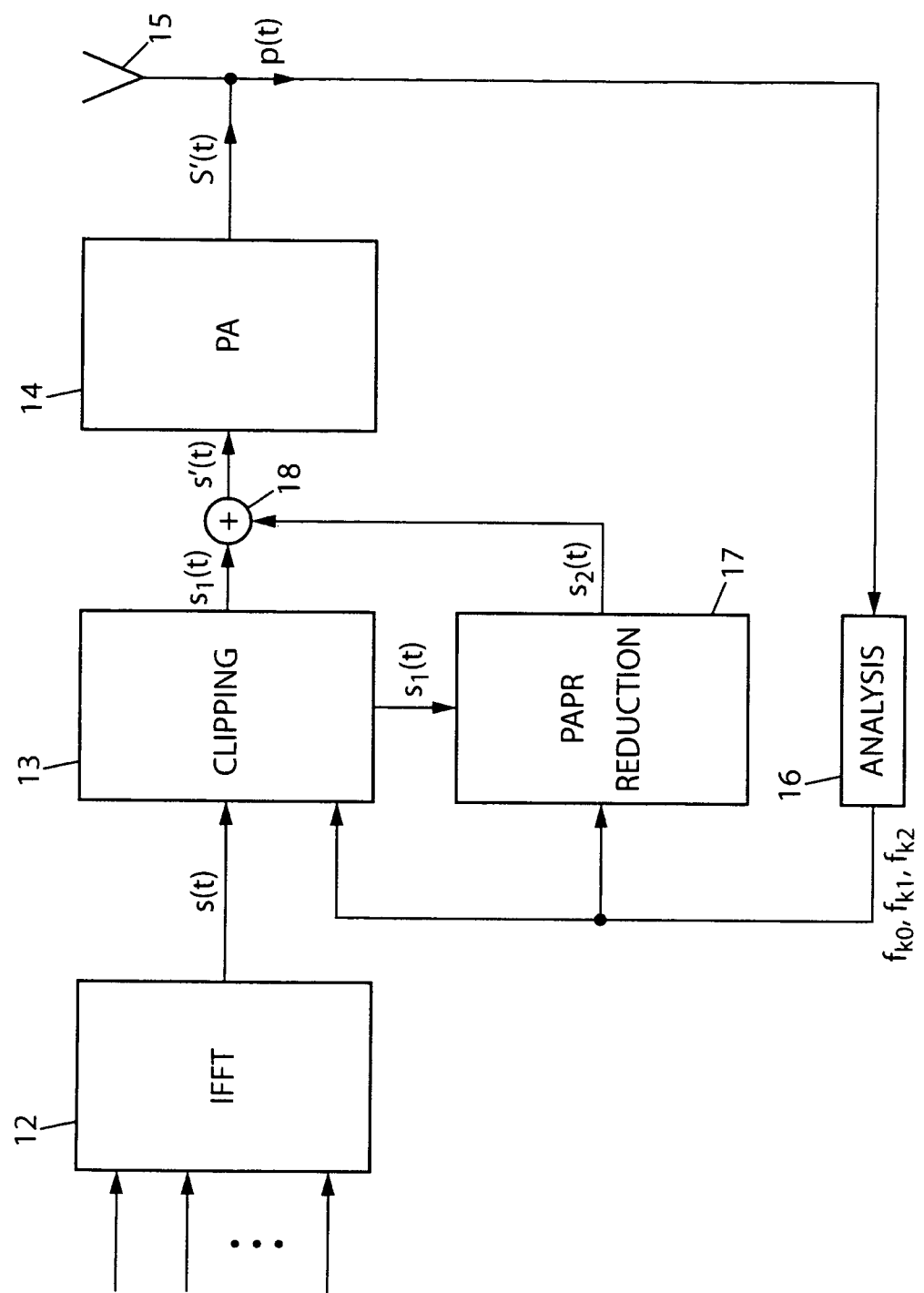
FIG. 4 is a schematic view of a transmitter according to an embodiment of the invention.

This situation is illustrated in FIG. 4 in which a transmission device, such as a base station, receives a signal p(t) from a reception device, such as a mobile station, and performs an analysis 16 on this signal so as to identify particularly attenuated frequency subcarriers.

As a result of this analysis 16, the transmission device knows which one or which ones among the plurality of frequency subcarriers illustrated in FIG. 2 are particularly subjected to attenuation. In the example shown in FIG. 4, three frequency subcarriers are so identified, namely $f_{k0}$, $f_{k1}$ and $f_{k2}$, where k1, k2 and k3 represent integers between 0 and N−1.

These identified frequency subcarriers are then used to reduce the PAPR. No information element is sent over these identified frequency subcarriers, by contrast with the other frequency subcarriers. To achieve this, a clipping 13 is performed on the OFDM signal s(t) as shown in FIG. 4.

Indeed, s(t) is the OFDM signal outputted by the IFFT 12 and having the form shown in the equation (1) above.

The clipping 13 removes the components of s(t) corresponding to the frequency subcarriers $f_{k0}$, $f_{k1}$ and $f_{k2}$ and outputs a signal $s_1(t)$ such that:

$$s_1(t) = \frac{1}{\sqrt{N}} \sum_{\substack{k=0 \\ k \notin \{k0,k1,k2\}}}^{N-1} a_k e^{j\frac{-2\pi k \Delta f}{N}}. \quad (2)$$

A PAPR reduction module 17 receiving $s_1(t)$ from the clipping module 13 calculates coefficients $a_{k0}$, $a_{k1}$, and $a_{k2}$ in replacement of the removed components of s(t) and outputs a signal $s_2(t)$ such that:

$$s_2(t) = \frac{1}{\sqrt{N}} \sum_{k \in \{k0,k1,k2\}} a_k e^{j\frac{-2\pi k \Delta f}{N}}. \quad (3)$$

The signals $s_1(t)$ and $s_2(t)$ are then summed by a summer 18. The output result of this sum is a signal s'(t) representing the OFDM signal with a reduced PAPR. It is then inputted into a power amplifier PA 14 whose output S'(t) is finally transmitted via the antenna 15 to the attention of a reception device.

In the PAPR reduction module 17, the coefficients $a_{k0}$, $a_{k1}$, and $a_{k2}$ are set so that the envelope of s'(t)=$s_1(t)$+$s_2(t)$ is less than the envelope of s(t). This can be achieved for instance by forcing s'(t) to be on or inside the circle gauge 10 (beyond which saturation may occur in the power amplifier PA 14) as shown in FIG. 5.

For sake of clarity, in the example illustrated in FIG. 5, it has been assumed that only one frequency subcarrier of the plurality, namely $f_{ka}$, has been identified by the analysis module 16 of the transmission device as being particularly subjected to attenuation.

As shown in FIG. 5, the complex representation of the signal $s_1(t)$ obtained after clipping goes beyond the circle 10, which means that its envelope is large and may result in a high PAPR.

The PAPR reduction module 17 outputs a signal $$s_2(t) = \frac{1}{\sqrt{N}} a_{ka} e^{j\frac{-2\pi ka \Delta f}{N}}$$

whose argument depends on the corresponding frequency subcarrier $f_{ka}$ (since it is proportional to $k_a.\Delta f$). As mentioned above, the coefficient $a_{ka}$ is set so that the envelope of s'(t)=$s_1$(t)+$s_2$(t) is less than the envelope of s(t). In the example illustrated in FIG. 5, $a_{ka}$ is set so that $|s'(t)|^2=|s_1(t)+s_2(t)|^2=1$. In other words, s'(t) ends up on the circle 10. Still in other words, the amplitude of s'(t) is equal to or less that the value above which the power amplifier PA 14 reaches saturation. By this, no information element will be sent over the frequency subcarrier $f_{ka}$, since $a_{ka}$ is chosen for PAPR reduction purposes only and is not related to the information to be sent.

In this way, the PAPR is reduced by using s'(t) instead of s(t), due to the way $a_{ka}$ (or the coefficients corresponding to the different frequency subcarriers previously identified) is set. The risk of saturation in the PA 14 is also limited.

It will be understood that, in case several particularly attenuated frequency subcarriers would have been identified, the way of setting the corresponding coefficients would be similar. In this case indeed, the coefficients would be set so that the resulting signal $s_2(t)$ leads s'(t)=$s_1(t)$+$s_2(t)$ to end up on the circle 10.

By contrast with the prior art frequency band reservation for instance, the present invention has the advantage of requiring no additional cost in terms of bandwidth to reduce the PAPR. Besides, the loss of information induced is negligible, since the particularly attenuated frequency subcarriers would not highly contribute to information delivery anyway. Likewise, there is few chance that the reception device incorrectly interprets the bits received over the particularly attenuated frequency subcarriers, precisely because those bits will be received in a very attenuated way.

We claim:

1. A method for transmitting a signal carrying information data over a plurality of frequency subcarriers simultaneously, comprising the following steps:

identifying a set of at least one frequency subcarrier of the plurality particularly subjected to attenuation, wherein identifying a set of at least one frequency subcarrier of the plurality is carried out at successive time intervals;

transmitting the signal simultaneously over said plurality of frequency subcarriers by assigning respective information data to the frequency subcarriers of the plurality not belonging to said set and assigning to each frequency subcarrier of said set a respective coefficient set so that an envelope of the transmitted signal is less than an envelope of the signal that would be transmitted by assigning respective information data to all the frequency subcarriers of the plurality.

2. The method as claimed in claim 1, wherein each coefficient is set so that the amplitude of the transmitted signal is equal to or less than a value above which a module involved in the signal transmission reaches saturation.

3. The method as claimed in claim 1, wherein said successive time intervals are chosen so as to depend on a parameter affecting attenuation.

4. The method as claimed in claim 1, wherein identifying a set of at least one frequency subcarrier of the plurality comprises analyzing a previously received signal.

5. The method as claimed in claim 4, wherein the previously received signal was received in an uplink time slot and said signal is transmitted in a downlink time slot following said uplink time slot.

6. The method as claimed in claim 1, wherein transmitting the signal simultaneously over said plurality of frequency subcarriers is performed in a time division duplexing manner.

7. A transmission device arranged for transmitting a signal carrying information data over a plurality of frequency subcarriers simultaneously, comprising:

identification means for identifying a set of at least one frequency subcarrier of the plurality particularly subjected to attenuation, wherein the identification means are carried out at successive time intervals;

transmission means for transmitting the signal simultaneously over said plurality of frequency subcarriers by assigning respective information elements to the frequency subcarriers of the plurality not belonging to said set and assigning to each frequency subcarrier of said set a respective coefficient set so that an envelope of the transmitted signal is less than an envelope of the signal that would be transmitted by ass1gmng respective information data to all the frequency subcarriers of the plurality.

8. The device as claimed in claim 7, wherein each coefficient is set so that the amplitude of the transmitted signal is equal to or less than a value above which a module of the transmission device reaches saturation.

9. The device as claimed in claim 7, wherein said successive time intervals are chosen so as to depend on a parameter affecting attenuation.

10. The device as claimed in claim 7, wherein the identification means comprise analysis means for analyzing a previously received signal.

11. The device as claimed in claim 10, wherein the previously received signal was received in an uplink time slot and the transmission means transmit said signal in downlink time slot following said uplink time slot.

12. The device as claimed in claim 7, wherein the transmission means are arranged for operating in a time division duplexing manner.

* * * * *

UNITED STATES PATENT AND TRADEMARK OFFICE
CERTIFICATE OF CORRECTION

| | |
|---|---|
| PATENT NO. | : 8,982,683 B2 |
| APPLICATION NO. | : 11/593721 |
| DATED | : March 17, 2015 |
| INVENTOR(S) | : Nidham Ben Rached et al. |

It is certified that error appears in the above-identified patent and that said Letters Patent is hereby corrected as shown below:

In the Claims:

Claim 7, Column 6, Line 45, please delete "ass1gmng" and substitute -- assigning --

Signed and Sealed this
Fourteenth Day of July, 2015

Michelle K. Lee
*Director of the United States Patent and Trademark Office*